United States Patent [19]

Zhao et al.

[11] Patent Number: 5,511,420

[45] Date of Patent: Apr. 30, 1996

[54] ELECTRIC FIELD ATTRACTION MINIMIZATION CIRCUIT

[75] Inventors: Yang Zhao, North Andover; Stephen Lewis, Reading, both of Mass.

[73] Assignee: Analog Devices, Inc.

[21] Appl. No.: 347,703

[22] Filed: Dec. 1, 1994

[51] Int. Cl.$^6$ .................................................. G01P 15/125
[52] U.S. Cl. ................................ 73/514.18; 73/514.32; 73/862.61; 73/862.626
[58] Field of Search ............................ 73/517 R, 517 B, 73/654, 862.61, 862.626, 862.68, 514.18, 514.32; 361/280, 283.3

[56] References Cited

U.S. PATENT DOCUMENTS

| | | | |
|---|---|---|---|
| 4,584,885 | 4/1986 | Cadwell | 73/862.61 |
| 4,932,261 | 6/1990 | Henrion | 73/654 |
| 4,987,779 | 1/1991 | McBrien | 73/517 B |

*Primary Examiner*—John E. Chapman
*Attorney, Agent, or Firm*—Hale and Dorr

[57] ABSTRACT

A circuit for minimizing electrostatic forces in capacitance-based sensor circuits. A sensor includes a movable mass that forms the center electrode of two differential capacitors, a sensing differential capacitor and an actuator differential capacitor. The other two electrodes of each differential capacitor are fixed. Oppositely phased high-frequency carrier signals are applied to the fixed electrodes of the sensing capacitor and biasing signals are applied to the fixed electrodes of the actuator capacitor. When a force is applied to the sensor, the capacitance of the sensing capacitor changes and the carrier signal, with its amplitude and phase modulated in accordance with the magnitude and direction of the force, appears on the movable mass. The signal on the mass is fed back to the fixed electrodes of the sensing capacitor to minimize electrostatic forces between the electrodes of the sensing capacitor. Using a separate negative feedback loop, a signal is fed back to the mass to generate electrostatic forces between the mass and the fixed electrodes of the actuator capacitor to restore the mass to its original position.

16 Claims, 4 Drawing Sheets

ELECTRIC FIELD ATTRACTION MINIMIZATION CIRCUIT

FIELD OF THE INVENTION

This invention relates to the field of force-sensing circuits and, more particularly, to circuits for minimizing electric field attraction in force-sensing circuits in micromachined structures.

BACKGROUND OF THE INVENTION

Micromachined silicon structures frequently are used to detect and measure acceleration through the use of a differential capacitor. In such sensors, a movable mass is positioned between two plates so that one capacitor is formed by one plate and the mass and a second capacitor is formed by the second plate and the mass.

The application of a force along a sensitive axis causes the mass to move relative to the plates, causing a change in the capacitances in the two capacitors of the differential capacitor, which causes a signal to appear on the mass that reflects the amount of acceleration. An accelerometer based on this principle and a process for fabricating such an accelerometer are described in commonly assigned U.S. Pat. Nos. 5,345,824 and 5,314,572.

Positive and negative bias voltages are applied, respectively, to the two plates, to provide an electrostatic force for positioning the mass. With a negative feedback loop, a voltage may be applied to the mass to create an electrostatic force that will offset the acceleration and maintain the mass centered between the plates.

Although this structure is well-suited to measure large accelerations (on the order of 50 g's), it is inadequate to measure accelerations on the order of 5 g's, where greater sensitivity is required. As described in commonly assigned U.S. patent application Ser. No. 08/347,795, entitled Sensor With Separate Actuator and Sense Fingers, and filed Dec. 1, 1994 by Roger Howe and Stephen Bart, which is incorporated herein by reference, this greater sensitivity is achieved by separating the sensing and force-feedback (actuator) functions.

With the separated sensing and force-feedback functions, ideally there should be no electrostatic force between the movable mass and the fixed sense capacitor plates. However, any signal that is present on the movable mass may create a net electric force between the mass and the two fixed sense capacitor plates, which distorts the accuracy and sensitivity of the accelerometer.

The present invention overcomes these problems as will be shown in the remainder of the specification referring to the attached drawings.

SUMMARY OF THE INVENTION

The present invention is a circuit to minimize the electric field attraction in position-sensing circuits in micromachined structures by minimizing average potential differences between the fixed sense capacitor plates and the movable mass. In one embodiment of the present invention, a feedback circuit imposes on the fixed sense capacitor plates a low-frequency signal that is produced by the force feedback signal impressed on the movable mass in response to the acceleration. This is accomplished without permitting the high frequency carrier signal from the fixed sense capacitor plates to appear at the output of the detector. In an alternative embodiment, a feedback circuit imposes a force-feedback signal on fixed actuator plates and the fixed sense capacitor plates are maintained at the same average potential as the movable mass.

A differential capacitor is formed by two fixed sense capacitor (excitation) plates and the movable mass. The movable mass serves as the common electrode of the two capacitors. In order to maximize the capacitance, the movable mass includes a series of fingers that extend between pairs of fingers from the two excitation plates. A carrier signal is applied to the two plates, but 180 degrees out of phase. In a preferred embodiment, when no force is applied to the sensor, each mass finger is midway between its two corresponding excitation plate fingers, the capacitances of the two parts of the differential capacitor are the same, and no portion of the carrier appears on the mass.

A second differential capacitor is formed by two fixed force, or actuator, capacitor plates and the movable mass, with the movable mass again serving as the common electrode of the two capacitors. The differential capacitor is formed by the interleaving of fingers from the movable mass with fingers from the fixed actuator plates. High and low fixed reference voltages are applied to the two actuator plates. In a preferred embodiment, when no acceleration force is applied to the sensor, each movable mass finger is midway between its two corresponding fixed actuator fingers, the capacitances of the two parts of the differential capacitor are the same, and the mass is at a voltage half-way between the two reference voltages. This yields no net electrostatic force on the movable mass while it is at its rest position. In a preferred embodiment, the center electrodes of the two differential capacitors form a single electrical node with the movable mass. However, the center electrodes could be electrically separated.

When a force is applied to the sensor, the movable mass fingers are displaced relative to the fixed excitation plate fingers of the sense capacitor structure and the fixed actuator capacitor plate fingers, and the mass receives the carrier signal, with its amplitude modulated in proportion to the magnitude of the displacement caused by the acceleration force.

The mass is directly coupled to the input of a buffer. The output of the buffer is fed back to the two sense capacitor excitation plates through a low-pass filter. The low-pass filter ensures that the low frequency signal on the movable mass that represents the acceleration is fed back to the excitation plates, but the high-frequency carrier from the plates is blocked from passing to the output of the buffer. However, the low-pass filter can be omitted.

In a preferred embodiment, the output of the buffer is also fed through a demodulator (to detect the displacement proportional carrier signal) and an amplifier, before it is input to a bond pad. This isolates the excitation plate fingers from the integrated circuit ("IC") chip pins and prevents inadvertent application of outside electrostatic charges to the sensor.

Alternatively, the demodulated and amplified signal may be fed back to the fixed sense capacitor excitation plates. Or, both the output of the buffer and the output of the amplifier may be connectable to the fixed sense capacitor excitation plates, with the feedback route selectable with one or more switches.

In either of these embodiments, the output of the amplifier is available to further signal processing circuitry, which may be off-chip. Input to one or both of the fixed sense capacitor excitation plates through the feedback loop may be provided to permit testing or biasing of the sensor.

Force-balancing feedback also may be provided to the mass, to create the proper electrostatic force in conjunction with the actuator plates to restore the mass to its original position. In a preferred embodiment, the force-balancing feedback is provided through the demodulator and the amplifier.

Alternatively, instead of feeding the low frequency acceleration-proportional force-feedback signal back to the excitation plates and the movable mass, the feedback may be provided to the two fixed actuator capacitor plates instead, to provide a force to restore the mass to its original position. To minimize any net electric force on the movable mass from the fixed sense capacitor excitation plates, the mass and the fixed sense capacitor excitation plates are biased to the same average potential.

An object of the present invention is to provide an improved acceleration sensor.

Another object of the present invention is to provide an improved circuit for minimizing unwanted electric field attraction within a force-sensing detector.

DETAILED DESCRIPTION OF THE INVENTION

Figure 1:
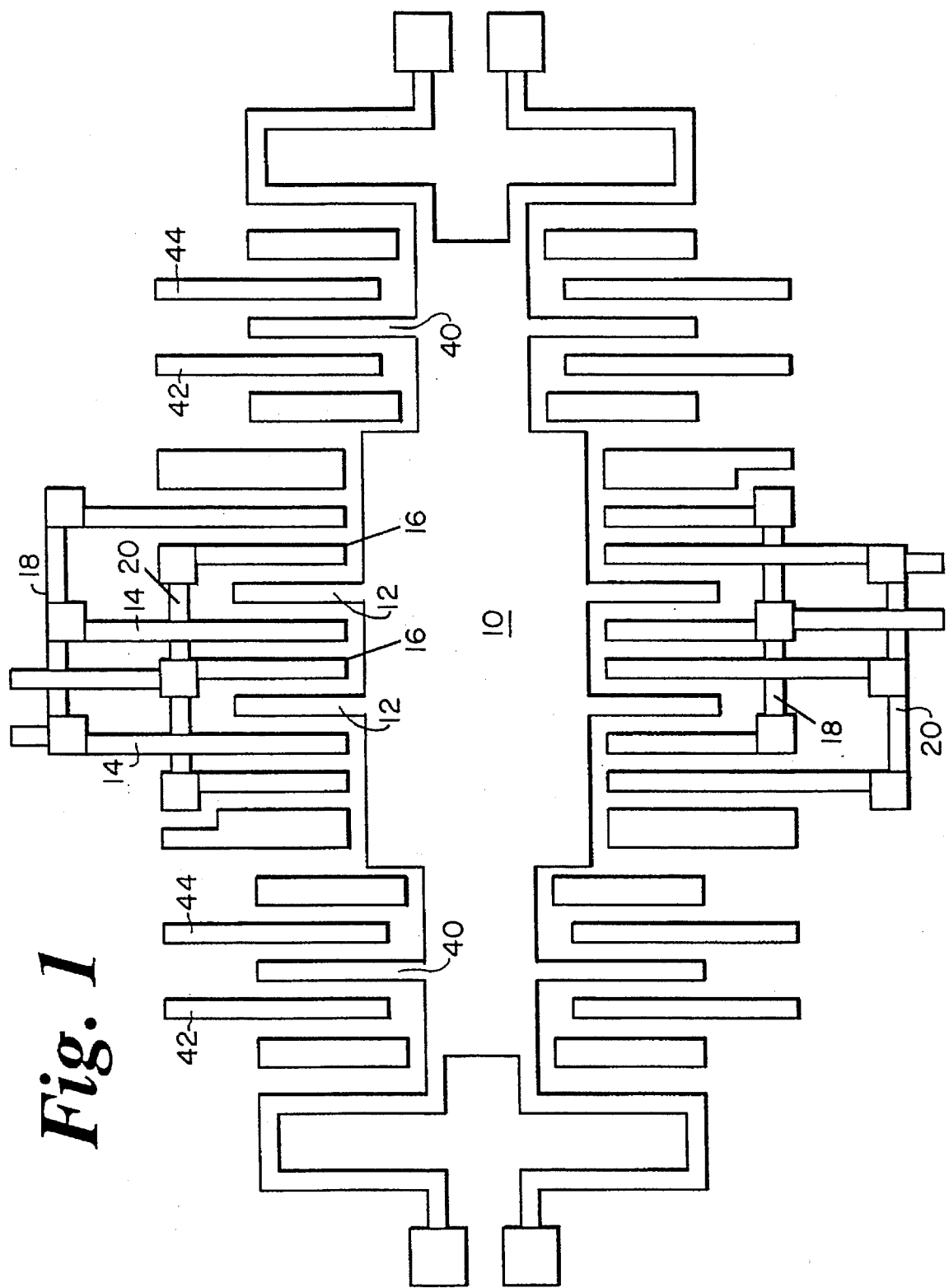
FIG. 1 is a top view of a micromachined differential capacitor sensor of the present invention.

With reference to FIG. 1, the sensor is a surface-micromachined structure. A polysilicon mass 10 is suspended above the silicon substrate. Mass 10 includes polysilicon sensing fingers 12, all of which together form a single electrode. Mass 10 and its sensing fingers 12 move laterally relative to the rest of the structure in response to a lateral force. The extent of any movement is proportional to the magnitude of the force, in accordance with the spring constant of the mass.

A first set of polysilicon fixed sense capacitor excitation fingers 14 and a second set of polysilicon fixed sense capacitor excitation fingers 16 also are suspended above the silicon substrate. Excitation fingers 14 and 16 do not move relative to the rest of the structure. The first set of polysilicon excitation fingers 14 together form a first excitation electrode 18 (FIGS. 1 and 2), and the second set of polysilicon excitation fingers 16 together form a second excitation electrode 20. The fingers are arranged so that, for each finger 12 of movable mass 10, one of the fingers 14 of first excitation electrode 18 is to the left of the finger 12 and one of the fingers 16 of second excitation electrode 20 is to the right of the finger 12. The fingers 12 of movable mass 10 are shown equally spaced between excitation fingers 14 and 16. However, the fingers 12 of movable mass 10 could be positioned closer to one set of excitation fingers than to the other set of excitation fingers. Although in a preferred embodiment, there are 20 sensing fingers 12, 20 fixed sense capacitor excitation fingers 14, and 20 fixed sense capacitor excitation fingers 16 on each side of movable mass 10, fewer are shown in FIG. 1 for clarity.

Movable mass 10, with its sensing fingers 12, forms sense electrode 22. Together, first excitation electrode 18, second excitation electrode 20, and sense electrode 22 form sense differential capacitor 24, with sense electrode 22 in the center. First excitation electrode 18 and sense electrode 22 form the first capacitor 26 of sense differential capacitor 24; second excitation electrode 20 and sense electrode 22 form the second capacitor 28 of sense differential capacitor 24.

Movable mass 10 also includes polysilicon force fingers 40. Suspended on opposite sides of each of the force fingers 40 are one of a first set of polysilicon actuator fingers 42 and one of a second set of polysilicon actuator fingers 44. Actuator fingers 42 and 44 do not move relative to the rest of the structure. The first set of actuator fingers are connected to form a first actuator electrode 46, and the second set of actuator fingers 44 are connected to form a second actuator electrode 48. Force fingers 40 together form force electrode 50. Together, first actuator electrode 46, second actuator electrode 48, and force electrode 50 form force differential capacitor 52. Force electrode 50 and sense electrode 22 are both parts of movable mass 10, with all parts of mass 10 forming one electric node. First actuator electrode 46 is set to first reference voltage V1 54 and second actuator electrode 48 is set to second reference voltage V2 56. Preferably, each force finger 40 is midway between the adjacent actuator fingers 42 and 44. In such an embodiment, force electrode 50, and hence movable mass 10, is at a potential halfway between the two reference voltages.

Figure 2:
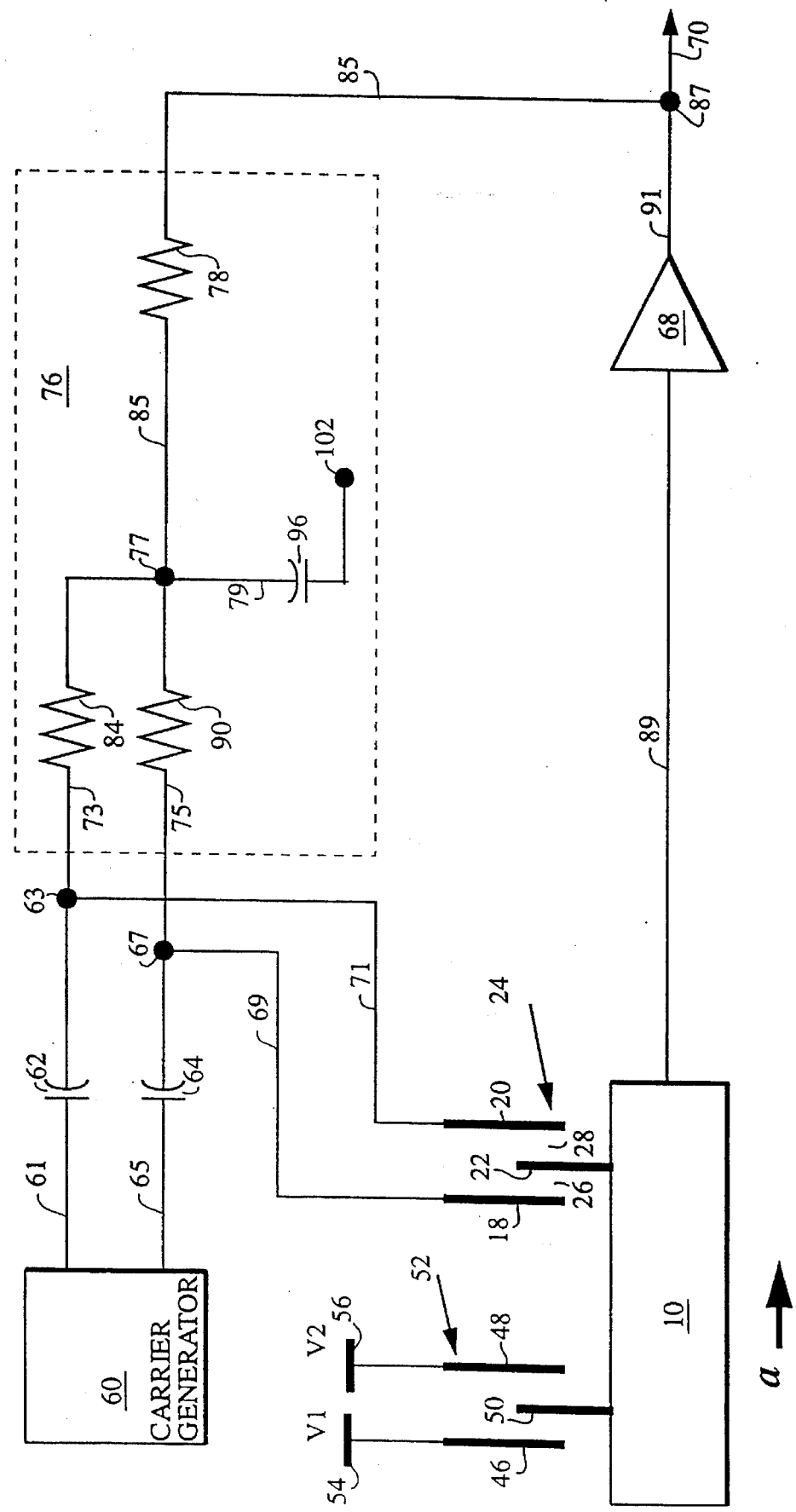
FIG. 2 is a partial block, partial schematic circuit diagram of a first embodiment of the present invention.

Referring to FIG. 2, the minimization circuit of the present invention is shown generally at 45. Carrier generator 60 generates two 1 megahertz carrier signals, of the same amplitude but 180 degrees out of phase. One of the carrier signals is input to line 61, which connects to node 63. Capacitor 62 is disposed in line 61. Line 71 connects node 63 and second excitation electrode 20. The second carrier signal is input to line 65, which connects to node 67. Capacitor 64 is disposed in line 65. Line 69 connects node 67 and first excitation electrode 18.

Capacitors 26 and 28 are of equal capacitance, so oppositely phased carrier signals from carrier generator 60 produce no net signal on sense electrode 22, as long as the electrodes do not move.

When a positive force is imposed on the sensor in the direction of arrow α, excitation electrodes 18 and 20 move to the right, in the direction of the force, relative to sense electrode 22. This causes electrodes 18 and 22 to be closer together than electrodes 20 and 22, and therefore the capacitance of capacitor 26 is greater than the capacitance of capacitor 28. Alternatively, other methods of changing the capacitances within a differential capacitor could be used. For example, the force could move the electrodes so that the effective areas of the capacitors changed.

The change in capacitance induces a signal on sense electrode 22 that is of the same frequency as the carrier signal, with its amplitude modulated in proportion to the magnitude of the displacement, which is proportional to the applied force. That is, a low frequency signal, typically less than 1000 Hz, is imposed on the carrier.

Line 89 connects movable mass 10, and therefore sense electrode 22, to the input of buffer 68. The output of buffer 68 on line 91 is input to node 87. Line 70 connects to node 87 and to other circuitry that further processes the signal. For example, the magnitude and duration of the force may be calculated by such other circuitry. The other circuitry also may be used to provide a force feedback signal on movable mass 10, as described below with respect to FIG. 3.

Feedback line 85 connects between node 87 and node 77. Node 77 connects to excitation electrodes 20 and 18 through carrier resistors 84 and 90, nodes 63 and 67, and lines 71 and 69, respectively. Carrier resistors 84 and 90 have approximately the same resistance. Resistor 78 is disposed in line 85 and forms one end of low-pass filter 76. Node 77 also connects to the silicon substrate at 102 through capacitor 96 via line 79. Alternatively, node 77 could connect to another fixed voltage reference, other than that of the silicon substrate, through capacitor 96. It is understood that a switched capacitor or other low-pass filters could be used.

Low-pass filter 76 permits the low frequency signal that corresponds to the acceleration to be fed back to first excitation electrode 18 and second excitation electrode 20, where it matches the low frequency component of the signal induced on sense electrode 22. As a result, electrostatic forces between sense electrode 22 and first excitation electrode 18, and between sense electrode 22 and second excitation electrode 20, are minimized.

Low-pass filter 76 also blocks substantially all of the 1 megahertz carrier signal at first excitation electrode 18 and second excitation electrode 20 from passing to the output of buffer 68. In a preferred embodiment, low-pass filter 76 allows signals below approximately 1 kilohertz to pass with minimal attenuation. However, the appropriate cut-off frequencies depend on the intended application and the physical Characteristics of mass 10.

Low-pass filter 76 can be designed so that the impedance of the filter with respect to first excitation electrode 18 and second excitation electrode 20 is variable. This is so that the same signal need not be fed back to both electrodes. This may be appropriate, for example, when sense electrode 22 is not centered between excitation electrodes 18 and 20, when the capacitances of the two capacitors of the differential capacitor otherwise are not identical when the sensor is not exposed to a force, or when it is desired to impress some form of active compensation scheme through this path.

Figure 3:
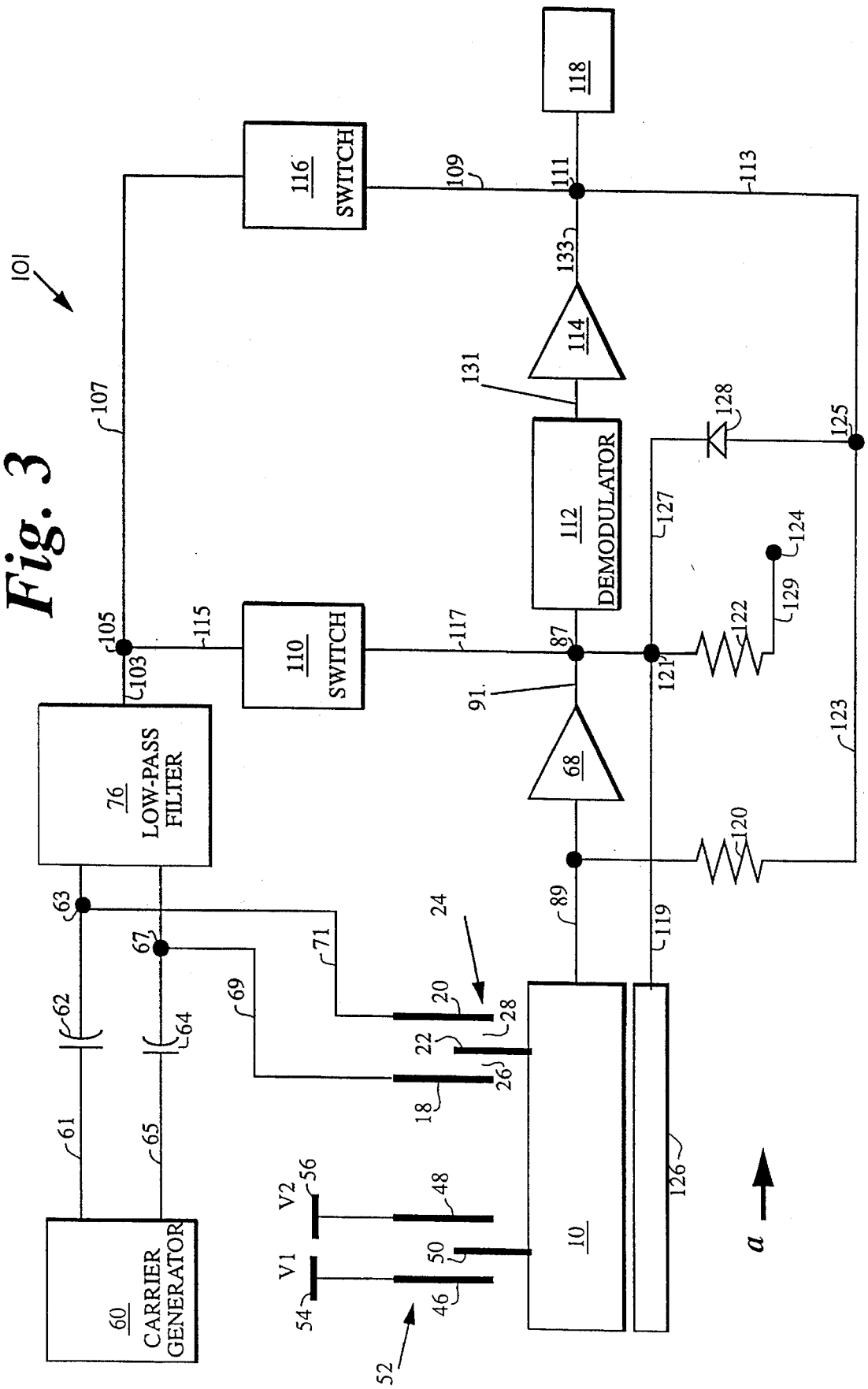
FIG. 3 is a partial block, partial schematic circuit diagram of a second embodiment of the present invention.

A second embodiment is shown in FIG. 3 generally at 101. In this embodiment, different feedback paths are provided to the low-pass filter and a force feedback loop is provided to movable mass 10. In FIG. 3, elements that are the same as those in FIG. 2 have the same reference numeral. Referring to FIG. 3, the input of low-pass filter 76 connects to node 105 via line 103. Switch 110 is added between the output of buffer 68 (at node 87) and low-pass filter 76 (at node 105). Node 105 connects to switch 110 via line 115. Switch 110 connects to node 87 via line 117. The output of buffer 68 at node 87 also is input to demodulator 112, which removes the carrier signal. The output of demodulator 112 on line 131 is input to and amplified by amplifier 114. The output of amplifier 114 on line 133 is connected to node 111. Node 111 connects to low-pass filter 76 through line 109, switch 116, line 107, node 105 and line 103. Node 111 also connects to bond pad 118 for taking signals off chip. This permits the measuring and processing of the sensing signal to determine, for example, the magnitude and duration of the force applied to the sensor. In a preferred embodiment, switch 110 and switch 116 are transistor switches.

The path through switch 110, with switch 116 open, isolates differential capacitor 24 from electrostatic charges from off-chip. However, with switch 110 open and switch 116 closed, outside signals can be fed back to differential capacitor 24 for testing or other purposes. When outside signals may be fed back to differential capacitor 24, low-pass filter 76 may have separate paths to first excitation electrode 18 and second excitation electrode 20, so that different signals can be input to the electrodes. Alternatively, the connections through switch 110 can be removed so that the feedback to the excitation fingers can be only from the output of amplifier 114.

A separate force-feedback loop may be used in conjunction with the feedback loop for sense differential capacitor 24, to force movable mass 10 back to its original position. The output of amplifier 114 at node 111 is fed back to mass 10 through resister 120 via line 113, node 125, and line 123. Alternatively, the output of amplifier 114 could be fed back through a time multiplexed switch.

Preferably, resistor 120 is situated above diffused resister 122, which reduces parasitic capacitance from the force-feedback loop. Diffused resistor 122 connects to the output of buffer 68 via node 121. Diffused resistor 122 also connects to the substrate at 124 via line 129. Thus, the high-frequency signals passing through resistors 120 and 122 (from beam 10 and the output of buffer 68, respectively) are substantially the same. The output of buffer 68 also is connected to n+ doped emitter diffusion region 126, which is positioned between the substram and mass 10 to reduce the effect of electric charges and parasitic capacitances on mass 10. Diode 128 prevents the voltage fed back from amplifier 114 from exceeding the buffer output by more than the voltage drop across the diode. In normal operation, diode 128 will remain off.

The movement of mass 10, which changes the capacitances of capacitors 26 and 28, also moves force electrode 50 closer to one of actuator electrodes 46 and 48 and further from the other actuator electrode. The negative feedback signal from amplifier 114 is of the proper amplitude to increase the electrostatic force between force electrode 50 and the further of actuator electrodes 46 and 48, and to decrease the electrostatic force between force electrode 50 and the closer of actuator electrodes 46 and 48, so as to return mass 10 to its original position.

Figure 4:
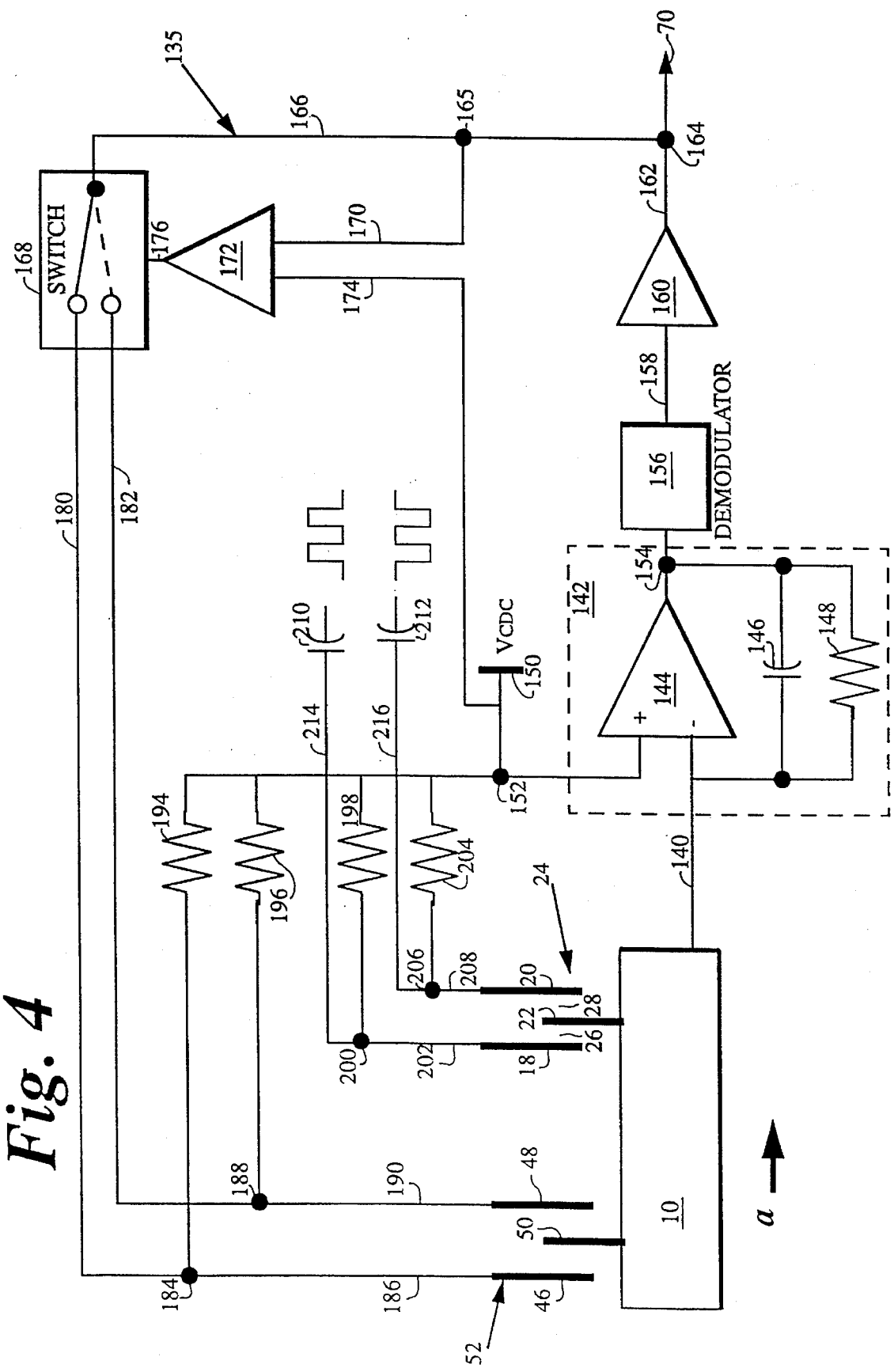
FIG. 4 is a partial block, partial schematic circuit diagram of a third embodiment of the present invention.

A third embodiment of the minimizing circuit of the present invention is shown in FIG. 4 generally at 135. In this embodiment, the force-feedback loop is applied to one of the fixed actuator capacitor plates to restore the movable mass to its original position and the mass and the fixed sense capacitor excitation plates are held at a constant d.c. bias.

Line 140 connects movable mass 10, and therefore sense electrode 22, to the inverting input of amplifier 144 of integrator 142. Integrator 142 also includes capacitor 146, and resistor 148. Capacitor 146 and resistor 148 are connected in parallel between line 154 at the output of amplifier 144 and line 140 at the inverting input of amplifier 144. The non-inverting input of amplifier 144 connects to $V_{C_{DC}}$ 150 via line 152.

Line 154 connects to the input of demodulator 156. The output of demodulator 156 on line 158 is input to amplifier 160. The output of amplifier 160 on line 162 is input to node 164. Line 70 connects to node 164 and to other circuitry that further processes the signal.

Line 166 connects the signal input of switch 168 to node 164. Alternatively, the signal input of switch 168 could be connected to a constant d.c. or other signal. Line 170 connects to node 165, disposed in line 166, and to one input of comparator 172. Line 174 connects the other input of comparator 172 to $V_{C_{DC}}$ 150. Line 176 connects the output of comparator 172 to the control input of switch 168. The control input of switch 168 routes the signal input of switch 168 to either line 180 or line 182. Line 180 connects to actuator electrode 46 via node 184 and line 186. Line 182 connects to actuator electrode 48 via node 188 and line 190.

Line 152, which is connected to $V_{CDC}$ 150, connects to node 184 (and therefore actuator electrode 46) through resister 194, and to node 188 (and therefore actuator electrode 48) through resistor 196. Resistors 194 and 196 establish reference voltages for actuator electrodes 46 and 48. Line 152 also connects through resister 198 to excitation electrode 18 via node 200 and line 202; and through resistor 204 to excitation electrode 20 via node 206 and line 208.

Resistors 198 and 204, with integrator 142, keep excitation electrodes 18 and 20 and sense electrode 22 at the same average potential. Alternatively, other circuits can be used to bias each of electrodes 18, 20 and 22 to the same average potential. For example, integrator 142 can be replaced with a buffer between line 140 and line 154, with $V_{CDC}$ 150 connected to line 140 through a resistor. Or, a time division multiplexed switch can be used to couple line 140 to $V_{CDC}$ 150.

Capacitors 210 and 212 connect oppositely phased 1 megahertz signals to nodes 200 and 206, respectively, via lines 214 and 216.

Switch 168 and comparator 172 feed the output of amplifier 160 (or, for example, a constant d.c. signal) to actuator electrode 46 or actuator electrode 48 so as to cause the net electrostatic force between actuator electrodes 46 and 48 and force electrode 50 to force movable mass 10 back to its neutral position.

The foregoing has been described with the entire circuit on a single chip. However, that is not necessary. For example, demodulator 112 and amplifier 114 (FIG. 3) could be on a separate chip.

While there have been shown and described examples of the present invention, it will be readily apparent to those skilled in the art that various changes and modifications may be made therein without departing from the scope of the invention as defined by the appended claims. Accordingly, the invention is limited only by the following claims and equivalents thereto.

We claim:

1. A sensor comprising:
    a sensing differential capacitor having a first sense electrode, a second sense electrode, and a third sense electrode, with the third sense electrode forming a first sense capacitor of the sensing differential capacitor with the first sense electrode and a second sense capacitor of the sensing differential capacitor with the second sense electrode, and with the capacitances of the first sense capacitor and the second sense capacitor being variable in response to a force applied to the sensor;
    means for coupling the first sense electrode to a first carrier signal and the second sense electrode to a second carrier signal of the same frequency, with the first carrier signal being 180 degrees out of phase with the second carrier signal;
    a buffer having an input coupled to the third sense electrode; and
    a low-pass filter coupled to the first sense electrode, the second sense electrode, and the output of the buffer, so that the filter is disposed between the first sense electrode and the output of the buffer and between the second sense electrode and the output of the buffer.

2. The sensor according to claim 1, wherein the first sense electrode, the second sense electrode, and the third sense electrode are polysilicon members suspended above a silicon substrate.

3. The sensor according to claim 2, wherein each of the first sense electrode, the second sense electrode, and the third sense electrode include a plurality of parallel fingers, with each of the plurality of fingers of the third sense electrode being interleaved between one of the plurality of fingers of the first sense electrode and one of the plurality of fingers of the second sense electrode.

4. The sensor according to claim 2, wherein the filter comprises:
    a buffer resistor having a first terminal coupled to the output of the buffer;
    a filter capacitor having a first terminal coupled to a voltage reference;
    a first electrode resistor having a first terminal coupled to the first sense electrode; and
    a second electrode resistor having a first terminal coupled to the second sense electrode, with a second terminal of the buffer resistor, a second terminal of the filter capacitor, a second terminal of the first electrode resistor, and a second terminal of the second electrode resistor being coupled.

5. The sensor according to claim 1, wherein the filter substantially passes signals at or below approximately 1 KHz and substantially blocks signals at or above approximately 1 MHz.

6. The sensor according to claim 1, wherein the impedance of the filter with respect to the first sense electrode is approximately the same as the impedance of the filter with respect to the second sense electrode.

7. The sensor according to claim 1, wherein the capacitance of the first sense capacitor is approximately the same as the capacitance of the second sense capacitor when the sensor is not exposed to the force.

8. The sensor according to claim 7, wherein the impedance of the filter with respect to the first sense electrode is approximately the same as the impedance of the filter with respect to the second sense electrode.

9. The sensor according to claim 1, wherein the impedance of the filter is adjustable.

10. The sensor according to claim 1, wherein the impedance of the filter with respect to the first sense electrode is adjustable and the impedance of the filter with respect to the second sense electrode is adjustable independently of the impedance with respect to the first sense electrode.

11. The sensor according to claim 1, further comprising:
    a force differential capacitor having a first force electrode, a second force electrode and a third force electrode, with the third force electrode being positioned between the first force electrode and the second force electrode and being connected to the third sense electrode, with the distance between the third force electrode and the first force electrode changing in a first direction in response to the force, and with the distance between the third force electrode and the second force electrode changing in a second direction in response to the force, the second direction being opposite the first direction;
    means for coupling the first force electrode to a first biasing signal having a first amplitude and the second force electrode to a second biasing signal having a second amplitude; and
    a force-balancing negative feedback loop having an output coupled to the force differential capacitor and an input coupled to the output of the buffer.

12. The sensor according to claim 11, wherein the force-balancing negative feedback loop includes a demodulator having an input coupled to the output of the buffer, an amplifier having an input coupled to an output of the demodulator, and means for coupling an output of the amplifier to the force differential capacitor.

13. The sensor according to claim 11, wherein the force-balancing negative feedback loop is coupled to the third force electrode.

14. A sensor comprising:

a differential capacitor having a first electrode, a second electrode, and a third electrode, with the third electrode forming a first capacitor of the differential capacitor with the first electrode and a second capacitor of the differential capacitor with the second electrode, and with the capacitances of the first capacitor and the second capacitor being variable in response to a force applied to the sensor;

first coupling means for coupling the first electrode to a first carrier signal and the second electrode to a second carrier signal of the same frequency as the first carrier signal, with the first carrier signal being 180 degrees out of phase with the second carrier signal;

a buffer having an input coupled to the third electrode;

a demodulator having an input coupled to an output of the buffer;

a low-pass filter coupled to the first electrode and the second electrode; and second coupling means for coupling the filter to an output of the demodulator, with the filter being disposed between the first electrode and the second coupling means and between the second electrode and the second coupling means.

15. The sensor according to claim 14, wherein the second coupling means comprises an amplifier.

16. The sensor according to claim 14, further comprising switchable means for coupling the output of the buffer to the filter, with the filter being disposed between the first electrode and the switchable means and between the second electrode and the switchable means, and with the second coupling means including a switch.

* * * * *